United States Patent Office 3,035,016
Patented May 15, 1962

3,035,016
ACYLOXY SILOXANES AND A METHOD OF USING THEM
Leonard B. Bruner, Midland, Mich., assignor to Dow Corning Corporation, Midland, Mich., a corporation of Michigan
No Drawing. Filed Mar. 16, 1959, Ser. No. 799,432
10 Claims. (Cl. 260—46.5)

This invention relates to acyloxy siloxanes which are capable of vulcanizing at room temperature to rubbery materials.

This application is a continuation-in-part of applicant's copending application Serial No. 723,110, filed March 24, 1958.

Elastomeric siloxane compositions which are capable of vulcanizing at room temperature have achieved considerable commercial success. Heretofore these compositions have always been sold commercially in at least a two-package system. In other words, at least one component had to be added to the system just prior to use. Consequently, the end-user had to go to the time and expense of mixing the ingredients. Furthermore, the materials had to be used within times ranging from a few minutes to a few hours subsequent to mixing. This was because there was no way of preventing vulcanization of the composition once the catalyst and the active ingredient, such as SiH compounds or alkoxy silicates, have been brought together.

There are many applications where the two-package system is perfectly adequate. This is particularly true in commercial establishments where rigid control is exercised over the process methods and where adequate measuring equipment is available for the workmen. However, there are other applications where the two-package system is not desirable because of the lack of skill of the workmen or because of equipment which is inadequate to carry out the mixing instructions with the necessary care. Also, it is always inconvenient to carry out a mixing operation. Furthermore, the two-package system has the inherent danger of loss of material. This can occur when the active ingredients have been mixed and it becomes impossible to use the elastomer prior to the time that it vulcanizes. Under such conditions the entire batch may be lost. For the above reasons there has been a long felt need in the silicone industry for a one-package room temperature vulcanizing elastomer. Such a material would be highly valuable for caulking applications and for coatings for various kinds of surfaces.

It is the object of this invention to provide novel compositions of matter which are suitable for use as a one-package room temperature vulcanizing elastomeric composition. Another object is to provide a room temperature vulcanizing composition of matter which can be stored for long periods of time prior to use. Another object is to provide improved caulking and coating compositions. Other objects and advantages will be apparent from the following description.

This invention relates to compositions of the general formula

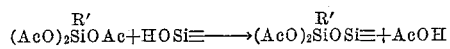

in which Ac is a saturated aliphatic monoacyl radical, R and R' are monovalent hydrocarbon, halogenated monovalent hydrocarbon radicals or cyanoalkyl radicals and $n$ is an integer of at least 5.

The compositions of this invention are prepared by reacting acyloxy silanes of the formula $R'Si(OAc)_3$ with hydroxylated siloxanes of the formula

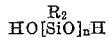

Reaction between the acyloxy silane and the hydroxylated siloxane occurs spontaneously upon mixing the two. The reaction may be presented schematically by the equation:

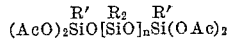

In order to obtain the compositions of this invention there must be at least one mol of acyloxy silane per mol of silicon-bonded hydroxyl in the siloxane. For practical operation it is best to employ more than one mol of acyloxy silane per silicon-bonded hydroxyl. This excess of acyloxy silane insures the formation of the compositions of this invention because it insures complete reaction with all of the silicon-bonded hydroxyls and because it acts as a scavenger for any moisture which may be present. The reaction is best carried out in the substantial absence of moisture since the latter interferes with the reaction. However, traces of moisture are not harmful particularly if an excess of the acyloxy silane is employed.

The reaction of this invention can be carried out at any convenient temperature although, in general, temperatures ranging from 20° C. to 100° C. are sufficient. It should be understood, of course, that higher or lower temperatures can be employed if desired although preferably the reaction should be carried out at temperatures below 200° C.

If desired, the reaction can be carried out in the presence of an inert solvent (that is a solvent which will not react with the acyloxy groups on the silicon). Suitable solvents include hydrocarbons such as benzene, toluene, xylene or petroleum ethers; halogenated solvents such as perchloroethylene or chlorobenzene and organic ethers such as diethylether and dibutylether; ketones such as methylisobutylketone and fluid hydroxyl-free siloxanes. The presence of solvents is particularly desirable when the hydroxylated siloxane is in the form of a high molecular weight gum. In these cases, the presence of the solvent reduces the overall viscosity of the mixture and facilitates the reaction. If desired, the composition may be kept in the solvent until it is to be used. This is particularly valuable when a gummy product is to be employed in coating applications.

The compositions of this invention are stable in the absence of moisture. Consequently, they can be stored for prolonged periods of time without any deleterious effect. During this period of storage little or no change occurs in the physical properties of the compositions. This is of particular importance from a commercial standpoint, since it assures that once a composition is prepared with a certain consistency and cure time that neither will change appreciably upon storage. This stability on storage is the characteristic which makes the compositions of this invention particularly useful as one-component room temperature vulcanizing compositions.

The compositions of this invention can be vulcanized by merely exposing them to moisture. These compositions can be vulcanized by exopsing them to the atmosphere with or without any additional water vapor. Upon exposure to moisture the compositions vulcanize at times varying from a few minutes to several hours depending upon the type of acyloxy group and the type of R' groups. In general, an increase in the molecular weight of either group will increase the time of cure.

For the purpose of this invention the Ac groups can be any saturated aliphatic monoacyl radical such as propionyl, butyryl, hexoyl, 2-ethylhexoyl, octanoyl, isovaleryl and stearyl. Also, for the purpose of this invention, R and R' can each be any monovalent hydrocarbon radical such as alkyl radicals such as methyl, ethyl, butyl, tertiary-butyl, octadecyl and myricyl; any alkenyl radical such as vinyl, allyl or hexenyl; any cycloaliphatic hydrocarbon radical such as cyclohexyl, cyclopentyl, cyclohexenyl and cyclobutyl; any alkaryl hydrocarbon radical such as benzyl or $\beta$-phenylethyl and any aromatic hydrocarbon radical such as phenyl, tolyl, xylyl, naphthyl, xenyl and phenanthryl. R and R' can also be any halogenated monovalent hydrocarbon radical such as chloromethyl, pentafluorobutyl, trifluorovinyl, chlorophenyl, bromophenyl, $\alpha,\alpha,\alpha$-trifluorotolyl, bromoxenyl, chlorotrifluorocyclobutyl, chlorocyclohexyl and iodophenyl.

In addition either R or R' or both can be any cyanoalkyl radical such as beta-cyanoethyl, gamma-cyano-propyl, omega-cyanobutyl, beta-cyanopropyl, gamma-cyanobutyl and omega-cyanooctadecyl. When the products of this invention contain cyanoalkyl radicals it is preferred that such radicals be attached to at least 1 mol percent of the silicon atoms in the siloxane elastomer.

For the purpose of this invention the polymer size of the compositions can vary from thin fluids where $n$ has a value of 5 to non-flowing gums where $n$ has a value of 10,000 or more. It should be understood that for the purposes of this invention mixtures of compounds can be employed which contain molecular species of varying values for $n$. It should also be understood that different acyl groups can be present in any one molecule and various types of R and R' groups can appear in any one molecule. In short, single acyloxy silanes can be employed in the reaction or mixtures of two or more different acyloxy silanes may be employed. Also, it should be understood that the hydroxylated siloxane can be a homopolymer or it can be a copolymer of two or more different siloxane units. It should also be understood that mixtures of two or more hydroxylated siloxanes can be employed. Often in actual commercial operation the compositions employed will be mixtures of several molecular species where $n$ has different values. It should be understood, of course, that a pure species where all of the molecules have the same degree of polymerization can also be used.

The compositions of this invention may be used per se in caulking and coating applications in which case they vulcanize to rubbery elastomeric materials upon exposure to moisture. However, it is often desirable to modify the compositions of this invention by mixing therewith other types of siloxanes and/or fillers. For example, it may be desirable to increase the adhesive qualities of the compositions of this invention by mixing therewith resinous siloxanes. These resinous siloxanes will also modify the elastic properties of the vulcanized compositions to make them more dough-like and less resilient. Such properties are highly desirable in certain caulking applications. It also may be desirable to plasticize the vulcanized compositions of this invention by incorporating therein certain unreactive hydroxyl-free siloxane plasticizing agents such as trimethyl endblocked dimethylsiloxanes.

The compositions of this invention can also be modified by incorporating therein any of the well-known reinforcing fillers such as fume silicas, silica aerogels, and precipitated silicas of high surface area. These fillers, if desired, can have organosilyl groups attached to the surface thereof. The fillers employed herein can also be nonreinforcing fillers such as coarse silicas such as diatomaceous earth, crushed quartz or metallic oxides such as titania, ferric oxide, zinc oxide and the like. If desired, fibrous fillers such as asbestos or glass may also be employed. In short, any of the fillers commonly employed with silicone rubbers may be employed in the compositions of this invention. In all cases it is desirable that the filler be substantially dry before admixing with the composition although some water can be tolerated if an excess of the acyloxy silane is employed.

The fillers are usually employed to increase the strength of the elastomeric compositions and also to modify the flow characteristics of the uncured composition. The latter is particularly important in caulking applications where it is undesirable to have any appreciable flow take place between the time the material is placed in the joint and the time curing occurs.

In addition to the above ingredients the compositions of this invention may contain any other desirable additive such as pigments, sun-screen agents, oxidation inhibitors and dielectric materials such as graphite and carbon black.

In those cases in which the compositions of this invention are modified with fillers, pigments or other siloxanes it is immaterial whether these materials are added to the composition before or after reaction with the silane. In other words, the hydroxylated siloxane may be mixed with a modifying siloxane and/or a filler and then reacted with the acyloxy silane. Alternatively, the hydroxylated siloxane may be reacted with the acyloxy silane prior to the addition of any modifiers.

The compositions of this invention are particularly adaptable for caulking applications on buildings, airplanes, automotive equipment and the like. One of the desirable features is the fact that the compositions give a surface cure within 30 minutes or less after exposure to the atmosphere but they remain substantially soft for years. Furthermore, the compositions of this invention adhere tenaciously to a wide variety of materials such as glass, porcelain, wood, metals and organic plastics. For this reason they are particularly adaptable for practically any type of caulking application.

Because the compositions of this invention combine the properties of a low temperature cure and good weatherability they are particularly adaptable for protective coatings on wood and other heat sensitive materials. Consequently, they extend the range of usefulness of organosiloxane coatings into areas which have not heretofore been open to such materials.

It should be understood that the instant compositions can be cured at elevated temperatures if desired. The rate of cure increases with increasing temperature.

The hydroxylated siloxanes employed in this invention are well-known materials and may be prepared by any of the methods commonly employed to prepare such materials. The acyloxy silanes employed herein are best prepared by one of two methods. The first is that of reacting the corresponding acid anhydride with the corresponding chlorosilane. Under these conditions reaction occurs spontaneously with the evolution of an acyl halide. For example, methyltrichlorosilane plus acetic anhydride gives methyltriacetoxysilane and acetyl chloride. The acetyl chloride can then be removed by distillation. The second method is that of reacting an alkali metal salt of the corresponding acid with a chlorosilane. For example, sodium formate plus methyltrichlorosilane gives methyltriformyloxysilane and sodium chloride.

The following examples are illustrative only and should not be construed as limiting the invention which is properly delineated in the appended claims. In the examples the following abbreviations occur: Me for methyl, Ph for phenyl and Vi for vinyl. The viscosities expressed in the examples were taken at 25° C.

*Example 1*

16.74 g. of a 524 cs. hydroxylated dimethylsiloxane fluid which contained a concentration of $1.666 \times 10^{-4}$ gram equivalent weights of silicon-bonded hydroxyls per gram of fluid were mixed with 2.23 g. of methyltriacetoxysilane and 10.15 g. of a 2 cs. trimethylsilyl endblocked dimethylsiloxane fluid. The latter was employed as a solvent and for the purpose of aiding in the removal of the excess methyltriacetoxysilane as shown below. The mixture was heated at 100° C. at reduced pressure for 1.5 hours. Under these conditions the acetic acid was removed as formed. The reaction mixture was then stripped at 100° C. at .5 mm. to remove the remaining acetic acid, excess methyltriacetoxysilane and the 2 cs. fluid. 10 ml.

more of the 2 cs. fluid were added and the product was again stripped for 1.25 hours at 100° C. at .5 mm.

The fluid product weighed 17.52 g. and was shown by analysis to contain a concentration of $3.16 \times 10^{-4}$ gram equivalent weights of silicon-bonded acetoxy groups per gram of fluid. This shows that the material had the formula

(MeCOO)$_2$SiO[SiO]$_{162}$Si(OOCMe)$_2$

The theoretical concentration of gram equivalent weights of acetoxy groups per gram of fluid for this composition is $3.18 \times 10^{-4}$.

The above fluid was stable on storage in the absence of moisture and cured in 1 to 1½ hours to form a rubbery product when exposed to the atmosphere.

*Example 2*

12.89 g. of a 98,500 cs. hydroxylated dimethylpolysiloxane fluid having a total of $3.46 \times 10^{-4}$ gram equivalent weights of silicon-bonded hydroxyl groups were dissolved in 25 ml. of a 2 cs. trimethyl endblocked dimethylpolysiloxane and mixed with 1.5 g. of methyltriacetoxysilane. The mixture was processed as in Example 1. The resulting fluid product was titrated with .1 N alcoholic KOH in a solution of anhydrous ether and isopropanol. Thymophthalein was used as an indicator. The titration showed that the product had a total of $7.42 \times 10^{-4}$ gram equivalent weights of silicon-bonded acetoxy groups showing that it was a composition of the formula

(MeCOO)$_2$SiO[SiO]$_{1007}$Si(OOCMe)$_2$

This viscous fluid was stable on storage in the absence of moisture but cured to a rubbery solid when exposed to the atmosphere.

*Example 3*

11.53 g. of a hydroxyl endblocked 3,3,3-trifluoropropylmethylsiloxane fluid were reacted with 7.18 g. of methyltriacetoxysilane in the manner of Example 1. The stripped fluid product weighed 13.83 g. and contained a concentration of $3.0 \times 10^{-3}$ gram equivalent weights of silicon-bonded acetoxy groups per gram. This shows that the material had the formula

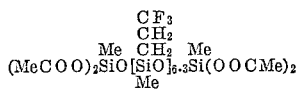
$$\begin{array}{c} CF_3 \\ CH_2 \\ Me \ CH_2 \ Me \\ (MeCOO)_2SiO[SiO]_{6.3}Si(OOCMe)_2 \\ Me \end{array}$$

and was a mixture of molecular species. The product was stable upon storage in the absence of moisture but cured when exposed to the atmosphere to a rubbery material.

*Example 4*

Employing the procedure of Example 1, 7.63 g. of a hydroxylated phenylmethylsiloxane fluid were reacted with 15 ml. of methyltriacetoxysilane. The product weighed 9.89 g. and analysis showed that it had the formula

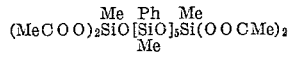
$$\begin{array}{c} Me \ Ph \ Me \\ (MeCOO)_2SiO[SiO]_5Si(OOCMe)_2 \\ Me \end{array}$$

This material was stable in the absence of moisture but set to a rubbery material when exposed to the atmosphere.

*Example 5*

300 g. of sodium formate was suspended in diethyl-ether and refluxed with 149 g. of methyltrichlorosilane for 16 hours. The product was distilled to give 140.5 g. of MeSi(OOCH)$_3$ boiling at 85° C. at 8 mm.

15.66 g. of a 524 cs. hydroxyl endblocked dimethylpolysiloxane fluid was reacted with 2.5 ml. of this methyltriformyloxysilane as shown in Example 1. The product was a fluid material having the formula

(HCOO)$_2$Si[SiO]$_{166}$OSi(OOCH)$_2$

This material was stable in the absence of moisture but cured to a rubbery material upon exposure to the atmosphere.

*Example 6*

A 6000 cs. hydroxyl endblocked dimethylpolysiloxane was reacted at room temperature by mixing it with an excess of methyltrioctanoyloxysilane. The resulting product was shown by analysis to have the formula

(H$_{15}$C$_7$COO)$_2$SiO[SiO]$_{439}$OSi(OOCC$_7$H$_{15}$)$_2$

This material was stable in the absence of moisture but cured to a rubbery material when exposed to the atmosphere.

*Example 7*

A 6000 cs. hydroxyl endblocked dimethylpolysiloxane fluid and an excess of 3,3,3-trifluoropropyltriacetoxysilane were dissolved in perchloroethylene. The materials reacted at room temperature to give a solution of the compounds of the formula

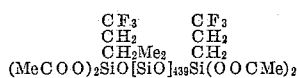
$$\begin{array}{cc} CF_3 & CF_3 \\ CH_2 & CH_2 \\ CH_2Me_2 & CH_2 \\ (MeCOO)_2SiO[SiO]_{439}Si(OOCMe)_2 \end{array}$$

The solution was applied to a glass surface and to paper and in both cases the siloxane cured to a rubbery film.

*Example 8*

A 6000 cs. hydroxyl endblocked dimethylpolysiloxane fluid was mixed with an excess of dodecyltriacetoxysilane and was allowed to react at room temperature to give a fluid compound of the formula

(MeCOO)$_2$Si$^{C_{11}H_{23}}$ O[SiO]$_{439}$Si$^{Me_2}$ $^{C_{11}H_{23}}$(OOCMe)$_2$ This material was stable in the absence of moisture but cured slowly in the atmosphere to give a milky, rubbery composition.

*Example 9*

Equivalent results were obtained when the following acyloxy silanes are reacted with the 6000 cs. polymer of Example 8 to give the compositions shown below.

| Acyloxy Silane | Reaction Product |
|---|---|
| Phenyltriacetoxysilane | (MeCOO)$_2$SiO[SiO]$_{439}$Si(OOCMe)$_2$ with Ph Me$_2$ Ph |
| Isobutyltriacetoxysilane | (MeCOO)$_2$SiO[SiO]$_{439}$Si(OOCMe)$_2$ with Me$_2$ CH CH$_2$Me$_2$ Me$_2$ CH CH$_2$ |
| Vinyltriacetoxysilane | (MeCOO)$_2$Si[OSi]$_{439}$Si(OOCMe)$_2$ with Vi Me$_2$ Vi |

*Example 10*

10 g. of a hydroxyl endblocked dimethylpolysiloxane gum, 6.7 g. of a finely divided silica having trimethylsilyl groups attached to the surface thereof and 2 g. of methyltriacetoxysilane were mixed with agitation in 150 ml. of 100° C. petroleum ether. Reaction of the gum and the silane occurred to give a solution of the composition of the formula

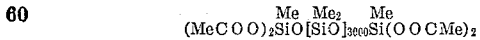
(MeCOO)$_2$SiO[SiO]$_{3000}$Si(OOCMe)$_2$

The solution was stable in the absence of moisture but when it was applied to a wooden panel the product cured to a tough, rubbery film.

*Example 11*

In this example and the following one the utility of the compositions of this invention in modified form for caulking applications is shown.

80 parts by weight of a 15,000 cs. hydroxyl endblocked dimethylpolysiloxane fluid and 20 parts by weight of a 1,000 cs. trimethyl endblocked dimethylpolysiloxane fluid [1] were mixed and there was added thereto with mix- ---
[1] The purpose of this fluid was to plasticize the composition in order to give it a lower consistency.

ing on a mill 10 parts by weight of a fume silica and 2 parts by weight TiO₂. To the mixed material 10 parts by weight of methyltriacetoxysilane was then added. Upon addition of the silane, reaction occurred with the hydroxylated fluid to give a composition of the formula $$\text{(MeCOO)}_2\text{SiO[SiO]}_{595}\overset{\text{Me}}{\underset{}{\text{Si}}}(\text{OOCMe})_2$$

This composition has been stored in cans and tubes in the absence of moisture for several months without change in consistency.

It was used to caulk joints between glass and porcelain, glass and aluminum, porcelain and stonee and two stone surfaces. In each case a secure bond to the various materials was obtained and the composition cured to give a tack-free surface in ½ hour after application.

Diatomaceous earth and crushed quartz were also employed in the above composition.

*Example 12*

400 parts by weight of a mixture of 55% by weight of a 3000 cs. hydroxyl endblocked dimethylpolysiloxane fluid and 45% by weight of a siloxane resin composed of Me₃SiO₁/₂ and SiO₂ units in such proportions that the methyl to silicon ratio was about 1.15, were mixed and milled with 320 parts by weight of crushed quartz, 16 parts by weight powdered asbestos and 32 parts by weight TiO₂. The resulting mixture was then mixed in a closed container with 64 parts by weight of methyltriacetoxysilane whereupon reaction between the acetoxysilane and the hydroxylated fluid occurred to give a composition of the formula

The resulting composition was placed in collapsible metal tubes. It is soft, pliable and extrudable after several months.

The composition was extruded from the tubes into joints of various kinds such as those in concrete block walls. It cured to give a satisfactory seal for the joint.

This material was also applied to a joint around a kitchen sink between porcelain and aluminum. The material set in an hour to give a water-tight seal with excellent adhesion to both surfaces. The seal is unaffected by detergents and hot water.

*Example 13*

When an excess of methyltriacetoxysilane is reacted with the following hydroxylated siloxanes, the following products are obtained.

Each of the products is stable in the absence of moisture and will cure upon exposure to the atmosphere.

*Example 14*

100 parts by weight of a hydroxyl endblocked gamma-cyanopropylmethylsiloxane of about 500,000 cs. viscosity were mixed with 5 parts by weight of methyltriacetoxysilane. The mixture stood at room temperature and was stable in the absence of moisture. The product was of the structural formula

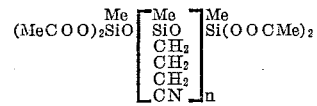

in which n has an average value greater than 100.

The resulting composition was exposed to atmospheric moisture and in a few hours it had cured to an elastomeric product.

*Example 15*

100 parts by weight of a hydroxylated 1,000,000 cs. copolymer of 80 mol percent gamma-cyanopropylmethylsiloxane and 20 mol percent dimethylsiloxane were mixed at room temperature with 5 parts by weight methyltriacetoxysilane. The resulting product was stable at room temperature and it had the general structural formula

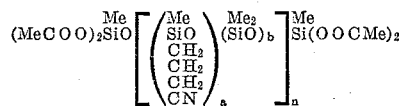

in which n has an average value above 250 and the average ratio of a to b is 4:1.

This product upon exposure to atmospheric moisture cured to an elastomeric product.

*Example 16*

100 parts by weight of a 100,000 cs. copolymer of 65 mol percent gamma-cyanopropylmethylsiloxane and 35 mol percent dimethylsiloxane were mixed with 5 parts by weight of methyltriacetoxysilane. The product obtained had the structural formula similar to that of Example 15 in which n had an average above 20 and the average ratio of a to b is 13:7. It was stable in the absence of moisture and cured to an elastomer when exposed to moisture.

*Example 17*

When an excess of beta-cyanoethyltriacetoxysilane is reacted with the following hydroxylated siloxanes, the following products are obtained.

| Hydroxylated Siloxane | Reaction Product |
|---|---|
| Vi<br>HO[SiO]₁₀₀H<br>Me | Me Vi Me<br>(MeCOO)₂SiO[SiO]₁₀₀Si(OOCMe)₂<br>Me |
| Ph₂ Me₂<br>HO[(SiO)(SiO)₅]₂₀₀H | Me Ph₂ Me₂ Me<br>(MeCOO)₂SiO[(SiO)(SiO)₅]₂₀₀Si(OOCMe)₂ |
| C₆H₁₁<br>HO[Si   O]₁₀₀H<br>Me | Me C₆H₁₁ Me<br>(MeCOO)₂SiO[Si   O]₁₀₀Si(OOCMe)₂<br>Me |
| Cl<br>⬡<br>HO[SiO]₂₅H<br>Me | Cl<br>⬡<br>Me       Me<br>(MeCOO)₂SiO[SiO]₂₅Si(OOCMe)₂<br>Me |
| C₁₈H₃₇<br>HO[Si   O]₂₀H<br>Me | MeC₁₈H₃₇ Me<br>(MeCOO)₂Si[Si   O]₂₀Si(OOCMe)₂<br>Me |

| Hydroxylated Siloxane | Reaction Product |
|---|---|
| HO[SiO(Me)(CH₂)(CH₂)(CN)]₁₀₀H | (MeCOO)₂SiO[SiO(Me)(CH₂)(CH₂)(CN)]₁₀₀Si(OOCMe)₂ with CH₂CH₂CN |
| HO[SiO(Me)(CH₂)(CHCN)(CH₃)]₂₀H | (MeCOO)₂SiO[SiO(Me)(CH₂)(CHCN)(CH₃)]₂₀Si(OOCMe)₂ with CH₂CN |
| HO[(SiO(Me)(CH₂)(CH₂)(CN))₈(SiO(Me₂))₂]₁₀₀H | (MeCOO)₂SiO[(SiO(Me)(CH₂)(CH₂)(CN))₈(SiO(Me₂))₂]₁₀₀Si(OOCMe)₂ with CH₂CH₂CN |

Each of the products is stable in the absence of moisture and will cure upon exposure to the atmosphere.

That which is claimed is:

1. A compound of the formula $$(AcO)_2SiO[SiO]_nSi(OAc)_2$$
with R', R₂, R' in which Ac is a saturated aliphatic monoacyl radical of a carboxylic acid, R and R' are selected from the group consisting of monovalent hydrocarbon radicals, halogenated monovalent hydrocarbon radicals and cyanoalkyl radicals and $n$ is an integer of at least 5.

2. A composition of matter capable of curing to an elastomer at room temperature in the presence of moisture comprising (1) a composition of the formula $$(AcO)_2SiO[SiO]_nSi(OAc)_2$$
with R', R₂, R' in which Ac is a saturated aliphatic monoacyl radical of a carboxylic acid, R and R' are selected from the group consisting of monovalent hydrocarbon radicals, halogenated monovalent hydrocarbon radicals and cyanoalkyl radicals and $n$ is an integer of at least 5 and (2) a filler.

3. A composition in accordance with claim 1 where Ac is an acetyl radical and R and R' are both methyl.

4. A composition in accordance with claim 2 where Ac is an acetyl radical and R and R' are both methyl.

5. A compound of the formula $$(CH_3COO)_2SiO\begin{bmatrix}CH_3\\SiO\\CH_2\\CH_2\\CF_3\end{bmatrix}_n^{CH_3}Si(OOCCH_3)_2$$

where $n$ is an integer of at least 5.

6. A composition in accordance with claim 2 where Ac is acetyl, R' is methyl and some of the R groups are phenyl and the remainder methyl.

7. A method comprising reacting in the substantial absence of moisture a hydroxylated siloxane of the formula $$HO[SiO]_nH$$
with R₂ with a silane of the formula R'Si(OAc)₃ in amount such that there is at least one mol of silane per mol of silicon-bonded hydroxyl whereby a product is obtained which cures on exposure to moisture but which is stable in the absence of moisture in which siloxane and silane Ac is a saturated aliphatic monoacyl radical of a carboxylic acid, R' and R are selected from the group consisting of monovalent hydrocarbon radicals, halogenated monovalent hydrocarbon radicals and cyanoalkyl radicals, and $n$ is an integer of at least 5.

8. A method in accordance with claim 7 in which Ac is an acetyl radical and both R and R' are methyl radicals.

9. A method in accordance with claim 7 in which the hydroxylated siloxane is $$HO(SiO)_nH$$
with CH₃, CH₂, CH₂, CF₃ where $n$ is an integer of at least 5 and the silane is methyltriacetoxysilane.

10. A composition of matter capable of curing to an elastomer at room temperature in the presence of moisture comprising (1) a composition of the formula $$(CH_3COO)_2SiO[SiO]_nSi(OOCCH_3)_2$$
with CH₃, CH₃, CH₃ / CH₂ / CH₂ / CF₃ where $n$ is an integer of at least 5, and (2) a filler.

References Cited in the file of this patent

UNITED STATES PATENTS

| 2,437,204 | McGregor | Mar. 2, 1948 |
| 2,467,853 | Poskitt et al. | Apr. 19, 1949 |
| 2,658,908 | Netzsche et al. | Nov. 10, 1953 |
| 2,894,969 | Pierce | July 14, 1959 |
| 2,910,496 | Bailey et al. | Oct. 27, 1959 |

FOREIGN PATENTS

| 577,824 | Canada | June 16, 1959 |